(No Model.)
H. R. POMEROY.
PROCESS OF COMMINUTING SEEDS AND SPICES.
No. 444,847. Patented Jan. 20, 1891.
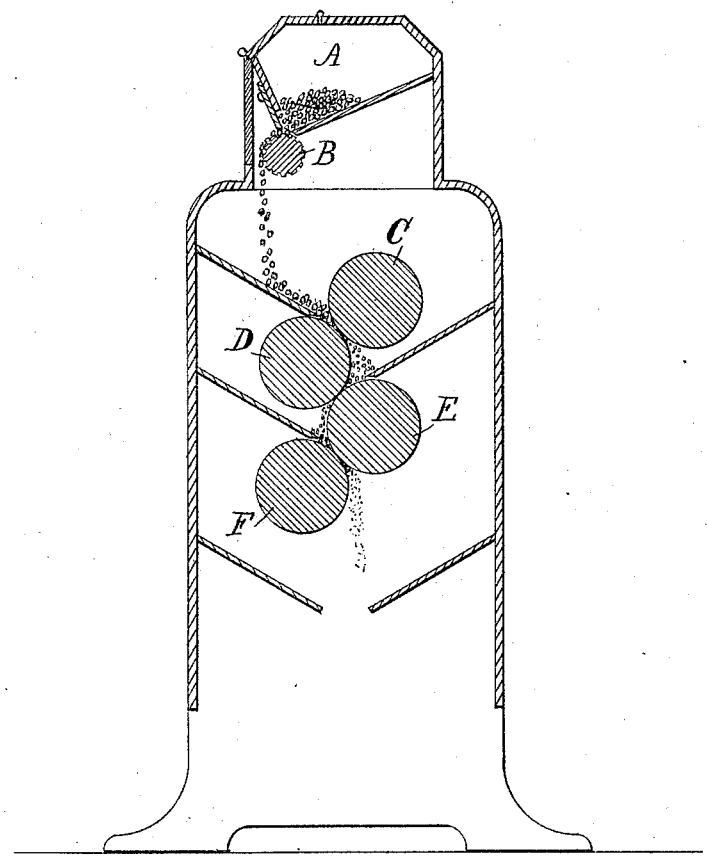

UNITED STATES PATENT OFFICE.

HENRY R. POMEROY, OF INDIANAPOLIS, INDIANA, ASSIGNOR OF TWO-THIRDS TO EDWARD E. STOUT, OF SAME PLACE.

PROCESS OF COMMINUTING SEEDS AND SPICES.

SPECIFICATION forming part of Letters Patent No. 444,847, dated January 20, 1891.

Application filed November 1, 1890. Serial No. 370,027. (No model.)

*To all whom it may concern:*

Be it known that I, HENRY R. POMEROY, a citizen of the United States, residing at Indianapolis, in the county of Marion and State of Indiana, have invented a new and useful Improvement in Processes of Comminuting Seeds and Spices, of which the following is a specification.

Heretofore in grinding or otherwise comminuting seeds and spices—such as celery and mustard seeds, and cloves, mace, and other spices—it has been found that the oils contained therein have made it practically impossible to reduce them to a fine powder until after a portion of the oil has been extracted by pressure or otherwise, thus losing a part of the strength of the spice or flavoring.

The object of my improvement is to avoid the labor and waste of extracting a portion of their oil from seeds and spices preparatory to reducing them to powder, to render said seeds or spices friable, and to retain in the powder all their essential oils.

To carry my invention into effect in comminuting celery-seed, heretofore found to be one of the most difficult to reduce to a powder, and most quickly losing its flavor when ground, I mix with the whole seed about one-third of its bulk of a dry inert absorbent of such a nature and consistency as will adhere to and envelop each seed. The substance best answering these conditions is ordinary wheat-flour. Starch or other like farinaceous material may also be used with good effect. After thoroughly mixing the seeds with the flour, which operation is preferably performed by hand, they are ground preferably by passing them between a pair of finely-corrugated rollers, as in the roller process of reducing grain to flour, or they may be ground in an ordinary stone or iron mill.

The accompanying drawing illustrates grinding of the celery-seed after it has been mixed with flour in an ordinary roller-mill. The mixed seed and flour is placed in compartment A, and passes from thence over the feed-roller B to and between the crushing-rollers C, D, E, and F.

In the process of grinding, as soon as the seeds are broken the oil which is liberated thereby is absorbed by the flour, as is also a portion of the oil which lies near the broken surfaces of the seeds, thus rendering the seeds more friable and preventing the clogging of the mill. Other oily seeds and spices are treated in a like manner. By this process I have been able to grind celery-seed many degrees finer than it could be obtained from any manufacturer of ground spices in this country.

Another result of the admixture of an absorbent like wheat-flour with celery-seed is, the retention of the flavor in the ground product. It has not heretofore been found practicable to flavor cakes or candies with celery, because the flavor has been driven off by the heat of the oven or the melted sugar. In the product of my process the flavor is perfectly retained when it is used in cakes or candies.

I claim as my invention—

1. That improvement in the art of comminuting seeds or spices containing oil which consists in mixing with said seeds or spice previous to grinding the same a farinaceous absorbent, as wheat-flour or starch, and then grinding or otherwise reducing the compound to powder.

2. The improved product resulting from first enveloping seeds or spices containing essential oils in a dry absorbent and then grinding said mixture to powder.

HENRY R. POMEROY.

Witnesses:
H. P. HOOD,
V. M. HOOD.